US011397425B2

(12) United States Patent
Sui et al.

(10) Patent No.: US 11,397,425 B2
(45) Date of Patent: Jul. 26, 2022

(54) CMP POLISHING SYSTEM AND ASSOCIATED PILOT MANAGEMENT SYSTEM

(71) Applicant: United Semiconductor (Xiamen) Co., Ltd., Fujian (CN)

(72) Inventors: Zhen Yu Sui, Shamen (CN); You Sheng Yin, Shamen (CN); Bing Xin Xu, Shamen (CN); Tao Liu, Singapore (SG); Wen Yi Tan, Fujian (CN)

(73) Assignee: United Semiconductor (Xiamen) Co., Ltd., Fujian (CN)

( * ) Notice: Subject to any disclaimer, the term of this patent is extended or adjusted under 35 U.S.C. 154(b) by 290 days.

(21) Appl. No.: 16/841,647

(22) Filed: Apr. 6, 2020

(65) Prior Publication Data

US 2021/0271232 A1    Sep. 2, 2021

(30) Foreign Application Priority Data

Mar. 2, 2020   (CN) .......................... 202010134312.7

(51) Int. Cl.
*G05B 19/418*  (2006.01)
*B24B 37/005*  (2012.01)

(52) U.S. Cl.
CPC ...... *G05B 19/41865* (2013.01); *B24B 37/005* (2013.01); *G05B 2219/45232* (2013.01)

(58) Field of Classification Search
CPC .......................................... G05B 2219/45232
See application file for complete search history.

(56) References Cited

U.S. PATENT DOCUMENTS 6,678,572 B1 * 1/2004  Oh ................... G05B 19/41865
                                                700/121
2008/0082197 A1 * 4/2008  Lacaille ................. G06N 5/043
                                                700/121

(Continued)

FOREIGN PATENT DOCUMENTS

CN      102866912 A    1/2013
CN      104572297 A    4/2015

(Continued)

OTHER PUBLICATIONS

Chyi-Tsong Chen and Yao-Chen Chuang, An Intelligent Run-to-Run Control Strategy for Chemical-Mechanical Polishing Processes, IEEE Transactions on Semiconductor Manufacturing, vol. 23, No. 1, Feb. 2010 (Year: 2010).*

*Primary Examiner* — Nathan L Laughlin
(74) *Attorney, Agent, or Firm* — Winston Hsu (57) ABSTRACT

A dispatch management method for Pilot-run on a computer and applicable to chemical mechanical polishing machines includes: generating initialization work schedules; filtering the initialization work schedules according to respective adaptability parameters to generate intermediate work schedules; performing crossing operations on the intermediate work schedules to generate M sets of crossed work schedules; performing mutation calculations on contents of the intermediate work schedules and the M sets of crossed work schedules to generate mutated work schedules; performing optimization calculations on the intermediate work schedules, the crossed work schedules and the mutated work schedules to generate a target work schedule; and automatically performing dispatch on the CMP machines according to the target work schedule.

18 Claims, 12 Drawing Sheets

(56) References Cited

U.S. PATENT DOCUMENTS

2014/0031965 A1* 1/2014 Sun .................. G06Q 10/06316
                                                    700/100
2021/0263505 A1* 8/2021 Zheng .................... G06N 20/00

FOREIGN PATENT DOCUMENTS

| CN | 105976030 A | 9/2016 |
|----|-------------|--------|
| CN | 107688909 A | 2/2018 |
| CN | 108416465 A | 8/2018 |
| CN | 108881432 A | 11/2018 |
| CN | 110059908 A | 7/2019 |
| CN | 110389819 A | 10/2019 |

* cited by examiner

CMP POLISHING SYSTEM AND ASSOCIATED PILOT MANAGEMENT SYSTEM

BACKGROUND OF THE INVENTION

1. Field of the Invention

The present invention relates to applications of Chemical Mechanical Polishing (CMP), and more particularly, to a CMP intelligent dispatch system and associated method based on a genetic algorithm.

2. Description of the Prior Art

The Chemical Mechanical Polishing (CMP) process is commonly seen in integrated circuit (IC) processing and photoelectric element processing, and is also referred to as Chemical-Mechanical Planarization. As far as the existing CU-CMP program structure is concerned, when the consumables need to be replaced, all products and the corresponding machines will have to be rescheduled, and the machines will be re-dispatched according to the new schedule (which is a trial production process after the replacement of the consumables and the routine machine testing/maintenance to ensure the stability of machine production, and is also referred to as "Pilot"). Accordingly, because the prior art Pilot approaches are mainly carried out by labor forces, it often results in the same kind of products being assigned to an unnecessary amount of machines, while the demand of the product may actually require much less, however. As a result, since an inappropriate Pilot strategy may cause the entire process to consume more time, how to reasonably perform Pilot is extremely important.

In addition, Head Idle seasoning is also a factor that significantly increases the production time of the machine during the CU-CMP production process. The so-called Head Idle is seasoning the idle time caused by discontinuous production during the head part of the machine structure of the CU-CMP model. When the number of consecutively drawn pieces of the machine is less than the number of wafers the machine can accommodate, the Head idle seasoning will thereby occur, which may greatly increase the time consumed by the machine in the production process. To cope with this issue, a reasonable scheduling is crucial to avoid continuously assigning few pieces to load ports, and may also solve the problem of unable to continuously draw wafer pieces due to insufficient wafer load ports, thereby reducing the possibility of Head idle seasoning.

SUMMARY OF THE INVENTION

In view of the above, an objective of the present invention is to provide a dispatch management method for pilot run on a computer and associated CMP system, in order to solve the problems in related art techniques.

An embodiment of the present invention provides a dispatch management method for Pilot-run on a computer and applicable to chemical mechanical polishing (CMP) machines. The dispatch management method comprising: generating K sets of initialization work schedules based on the machine information of the CMP machines; filtering the K sets of initialization work schedules according to respective adaptability parameters of the K set of initialization work schedules to generate L sets of intermediate work schedules; performing crossing operations on the L sets of intermediate work schedules for M times to generate M sets of crossed work schedules, wherein each of M crossing operations blend contents of a different duo of work schedules by respectively extracting portions of each of the duo in order to generate a set of crossed work schedules; performing mutation calculations on contents of the L sets of intermediate work schedules and the M sets of crossed work schedules to generate N sets of mutated work schedules; performing optimization calculations on the L sets of intermediate work schedules, the M sets of crossed work schedules and the N sets of mutated work schedules to generate a target work schedule; and automatically performing dispatch on the CMP machines according to the target work schedule.

An embodiment of the present invention provides a CMP system arranged to perform CMP dispatching management by Pilot-run on a computer. The CMP system comprises a plurality of CMP machines and a processor arranged to execute the following steps: generating K set of initialization work schedules according to machine information of a plurality of CMP machines; filtering the K sets of initialization work schedules according to respective adaptability parameters of the K set of initialization work schedules to generate L sets of intermediate work schedules; performing crossing operations on the L sets of intermediate work schedules for M times to generate M sets of crossed work schedules, wherein each of the M times of crossing operations is to blend contents of a different duo of work schedules by respectively extracting portions of each of the duo in order to generate a set of crossed work schedules; performing mutation calculations on contents of the L sets of intermediate work schedules and the M sets of crossed work schedules to generate N sets of mutated work schedules; performing optimization calculations on the L sets of intermediate work schedules, the M sets of crossed work schedules and the N sets of mutated work schedules to generate a target work schedule; and automatically performing dispatch on the CMP machines according to the target work schedule.

In view of the above, the present invention embodiment is capable of properly and efficiently improving the smoothness of Pilot-run for polishing units, and more particularly, may prevent continuously assigning few pieces to load ports, and may also solve the problem of unable to continuously draw wafer pieces due to insufficient wafer load ports, thereby reducing the possibility of Head idle seasoning.

These and other objectives of the present invention will no doubt become obvious to those of ordinary skill in the art after reading the following detailed description of the preferred embodiment that is illustrated in the various figures and drawings.

DETAILED DESCRIPTION

Some phrases in the present specification and claims refer to specific elements; however, please note that the manufacturer might use different terms to refer to the same elements. Further, in the present specification and claims, the term "comprising" is open type and should not be viewed as the term "consists of." The term "electrically coupled" can refer to either direct connection or indirect connection between elements. Thus, if the specification describes that a first device is electrically coupled to a second device, the first device can be directly connected to the second device, or indirectly connected to the second device through other devices or means.

An objective of the present invention is to solve the Head idle seasoning issue of Pilot operations caused by labor-force dispatching and unsuitable load port number arrangement.

The aforementioned labor-force operations may be performed in a remote control manner, that is, a staff may instruct the production line at the scene, or utilize a wireless communications device to remotely instruct the production line.

The present invention may reduce the possibility of Head idle seasoning in Pilot in an intelligent way, by combining Real Time Dispatch (RTD) with genetic algorithms to generate a more appropriate schedule. The detailed illustrations of the operations are introduces as follows.

Figure 1:
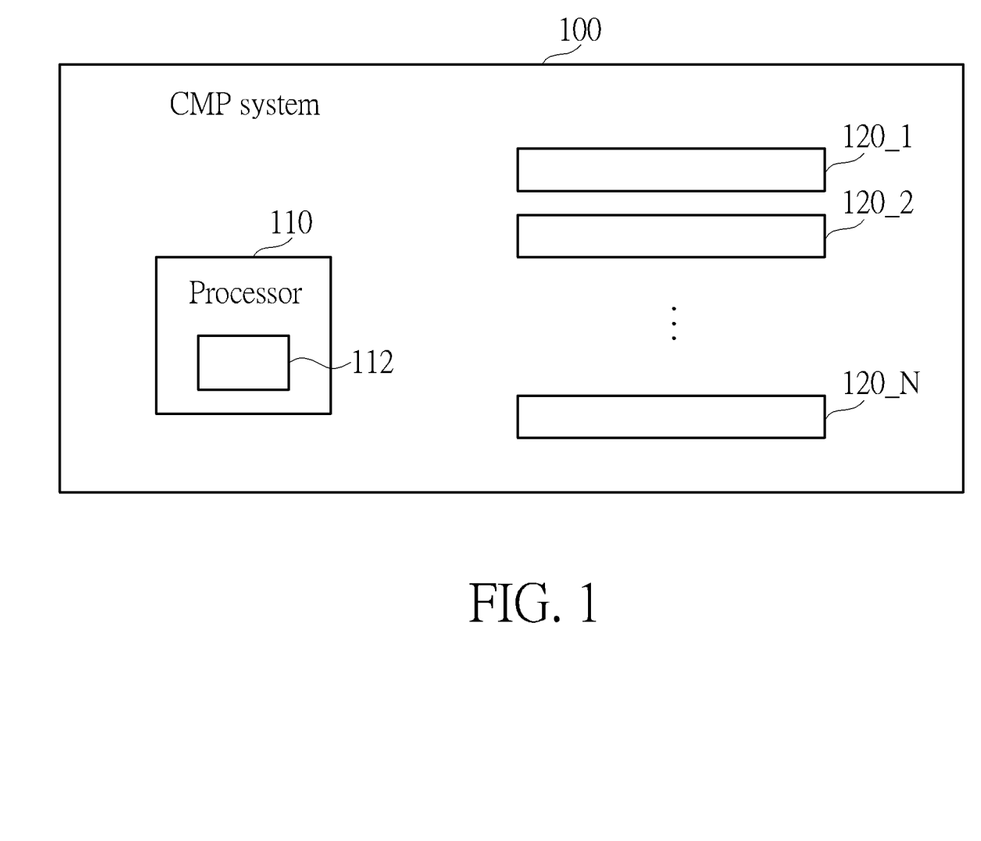
FIG. 1 is a diagram illustrating a CMP system according to an embodiment of the present invention.

Please refer to FIG. 1, which is a diagram illustrating a CMP system 100 according to an embodiment of the present invention, wherein the CMP system 100 is arranged to perform CMP dispatching management with Pilot-run on a computer. As shown in FIG. 1, the CMP system 100 comprises a plurality of CMP machines 120_1-120_N and a processor 110, wherein the processor 110 may generate corresponding multiple sets (e.g. K sets) of initialization work schedules according to the machine information of the CMP machines 120_1-120_N, and may further filter out fewer sets (e.g. L sets) from a majority (e.g. K sets, wherein L<K) of initialization work schedules as intermediate work schedules according to their respective adaptability parameters, wherein the filtering conditions may be preset in the computer, or adjusted according to actual needs. In addition, the machine information may comprise groups to which the products belong, the idle time and/or the operation time of machines. Further, the processor 110 comprises a Real time dispatching (RTD) system 112, and may perform crossing operations on the L sets of intermediate work schedules for at least one time (i.e. one or more times) to generate multiple sets (e.g. M sets) of crossed work schedules. The generated M sets of crossed work schedules and the aforementioned L sets of intermediate work schedules may be further performed with mutation operations to generate N sets of mutated work schedules. Lastly, optimization operations will be performed on the aforementioned L sets of intermediate work schedules, M sets of crossed work schedules and N sets of mutated work schedules to generate a target work schedule, and automatically perform intelligent dispatching corresponding to the CMP machines 120_1-120_N according to the target work schedule. In other words, the aforementioned target work schedule selects a most suitable work schedule from the (L+M+N) set of candidate work schedules, such as a specific work schedule that minimizes the time/power consumption. Preferably, the target work schedule may have the shortest total processing time, that is, the priority of selecting the target work schedule is to make the summation of the calculation time, Pilot time and the Head idle seasoning time as small as possible.

Figure 2:
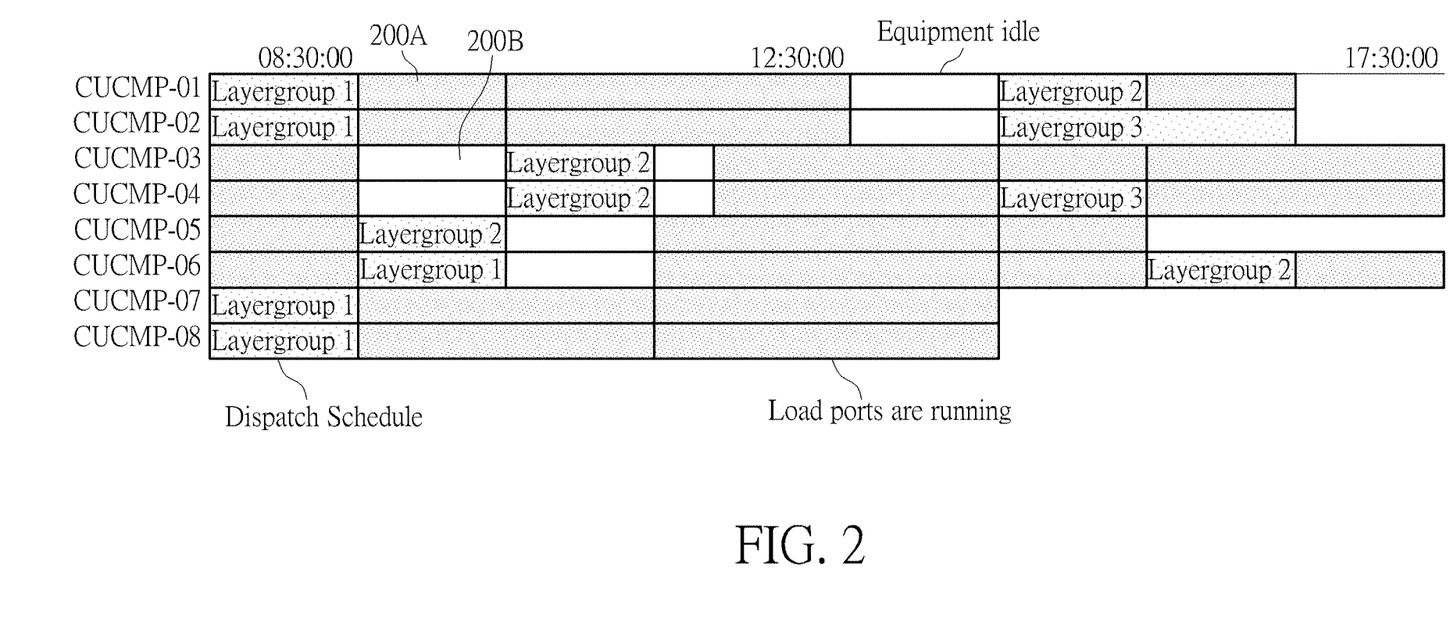
FIG. 2 illustrates performing production schedules for a plurality of CMP machines in a manual way according to a related art method.

Please refer to FIG. 2, which illustrates an example of performing production schedules for a plurality of CMP machines manually according to a related art method. The purpose of this example is to improve the comprehension about the dispatch management. As shown in FIG. 2, the blocks Layergroup 1, Layergroup 2, Layergroup 3 represent the respective Pilot processes of three different products. The darker color blocks (e.g. the block 200A) shows that the corresponding CU-CMP machine is in the state of running the load ports. Meanwhile, the light color blocks (e.g. block 200B), however, shows that the corresponding CU-CMP machine is in the state of equipment idle. As can be seen from the figure, each of the polishing machines CUCMP_01-CUCMP_08 encounters a plenty of idle time in the working hours within a day (e.g. 8:30-17:30), which severely deteriorates the overall production efficiency.

When the loading is full, the consumables of each CU-CMP polishing machine approximately are replaced once every two days. Then, when all products are manufactured on the machines, they need to be allocated to the layer groups to which the product belongs, in order to confirm the stability of the machine production before entering the mass production phase. The conventional Pilot method does not have a specific allocation logic for different materials of different layer groups during the Pilot process of the machine, and the corresponding layer group triggers the Pilot process when Pilot of the machine has not been executed yet. For example, Layer group 1 starts the Pilot process on a total of 5 machines, but the actual amount of products required by Layer group 1 on that day is not necessary to be this many (e.g., could be less than 50 tablets per day). Instead, using merely one machine is enough to meet the requirement in that day. As can be seen from the above, an improper scheduling not only increases the idle time of the machine, but also enables excessive machines, thereby increasing the cost.

Figure 3:
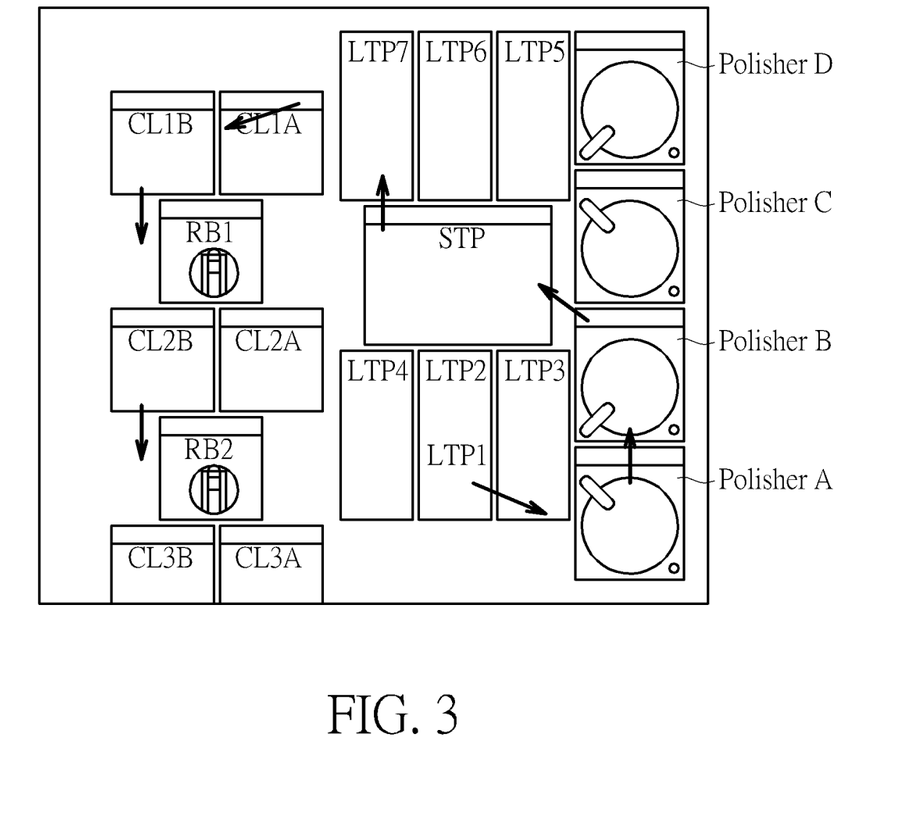
FIG. 3 is a diagram illustrating the structure of a machine manufacturing wafers.
Figure 4:
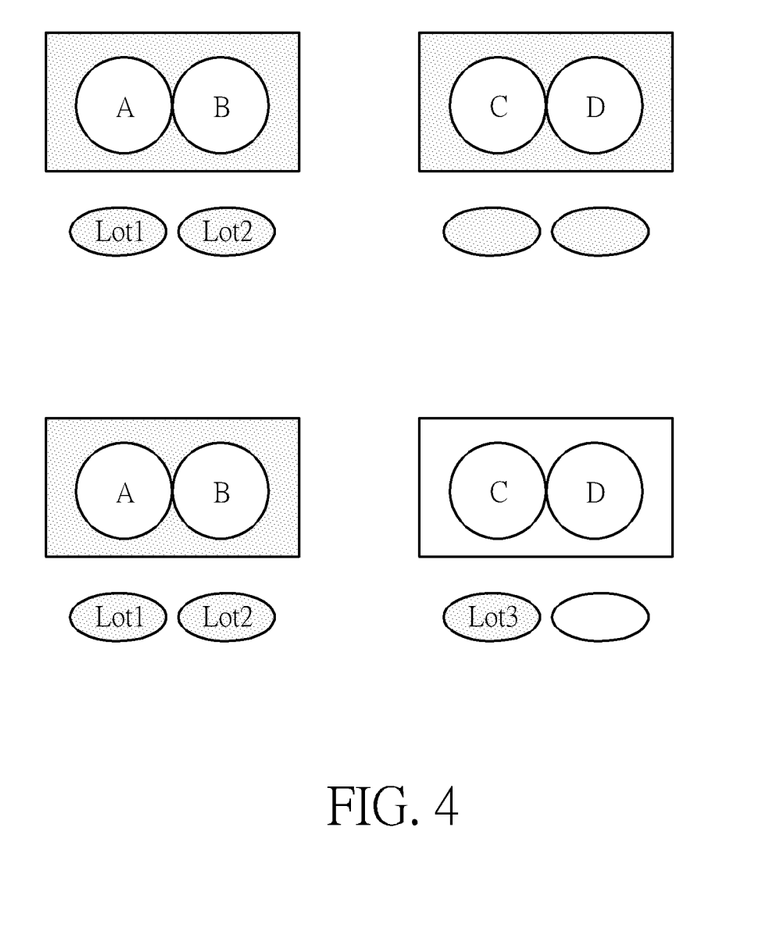
FIG. 4 is a diagram illustrating the dispatching logic in accordance with FIG. 3.

Please refer to FIG. 3 and FIG. 4. FIG. 3 is a schematic diagram of the wafer production machine structure 300. When the production process reaches the polishing stage, the wafers will be allocated to the polishing unit Polisher_A-Polisher_D, and thereby fill up the load ports (where the materials are temporarily placed before being sent to the machines) as much as possible to avoid the aforementioned Head idle seasoning problem. In this example, under the situation where the position inside the polishing unit is filled up and the number of wafers operating at the same time is 8, when the number of drawn pieces in consecutive two batches of wafers is less than 8, the Head idle seasoning will be triggered. With this in mind, the present invention aims at reasonably scheduling for two (or more) consecutive batches of materials, and dynamically balancing the load ports to make the drawing continuous. As the details of elements other than the polishing units Polisher_A-Polisher_D in the wafer production machine structure 300 can be readily understood by one skilled in the art, the detailed descriptions thereof are omitted here for brevity.

Please further refer to FIG. 4, which is a diagram illustrating the Pilot logic of corresponding FIG. 3. As shown in the upper half of FIG. 4, when the number of the wafers in each of the load ports Lot1, Lot2 corresponding to the AB side (Polisher_A, Polisher_B) has reached 8 (i.e. larger than or equal to 8), the AB Side (which is formed by the polishing units A, B) can reach the goal of continuous drawing on the machine without triggering the Head idle seasoning, by merely using the current two load ports Lot1, Lot2. Note that the polishing units A, B and the polishing units C, D respectively may have respective integral production functions, and thus may be utilized to define the AB side and the CD side respectively. However, as shown in the lower half of FIG. 4, when the number of pieces of the wafers in load ports Lot1, Lot2 is less than 8, there will be a need to incorporate another batch of materials and use an additional load port Lot3 to make the total number of wafers in the load ports Lot1, Lot2, Lot3 larger than or equal to 8 pieces. This is because 8 pieces of wafers may fill up all production positions on the AB side without triggering the Head idle seasoning, and meanwhile the tasks on the AB side still needs to use the load port Lot3 at the CD side, resulting in increase in cost.

Figure 5:
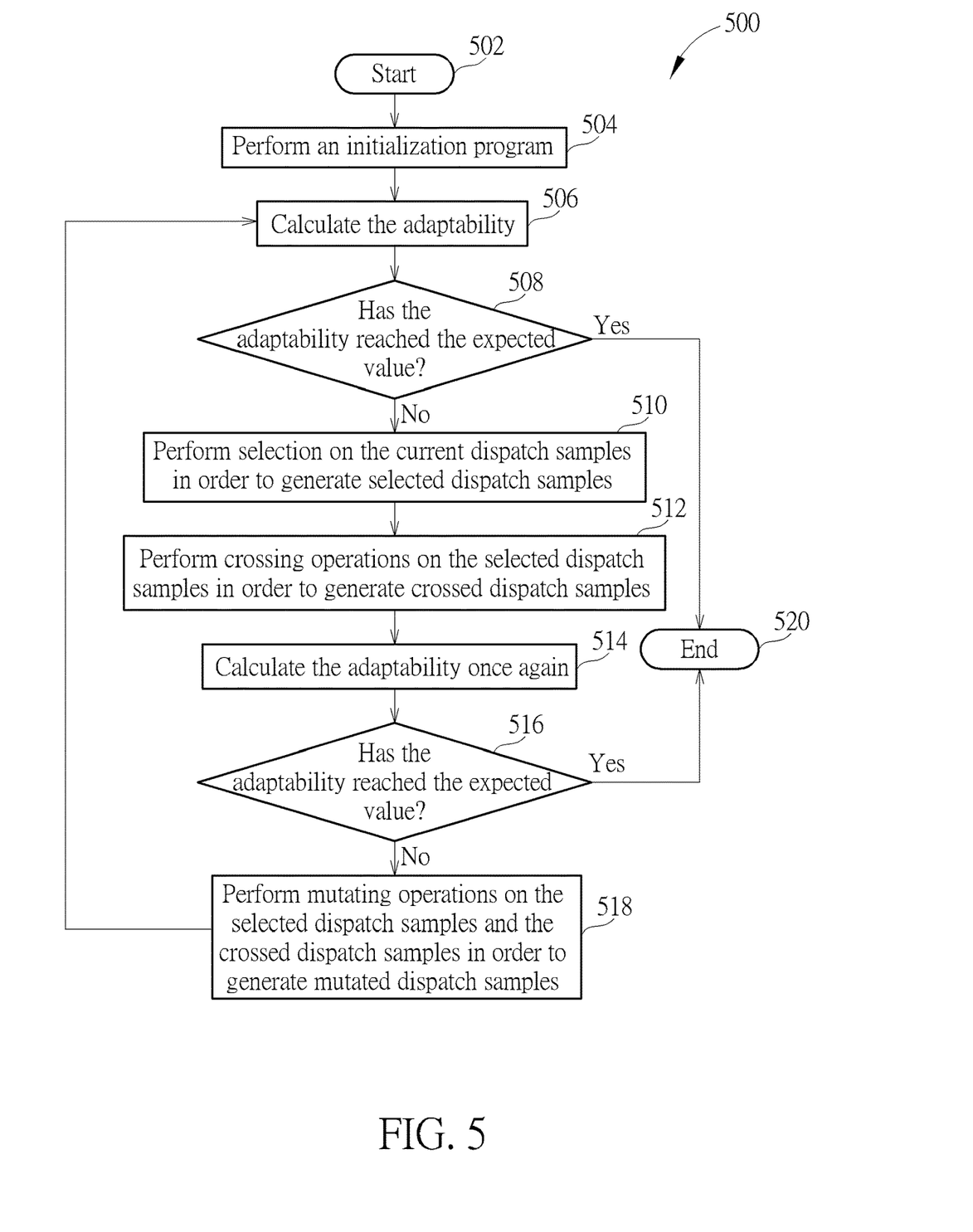
FIG. 5 is a flowchart illustrating a practice of a genetic algorithm according to the present invention.

Please refer to FIG. 5, which is a flowchart of a genetic algorithm suitable for CMP units according to an embodiment of the present invention. In short, a genetic algorithm may be a computational model of the biological evolution process that analogues to Darwin's biological evolution theory, which is considered as a method of searching for the optimal solution by analogizing the natural evolution process. The present invention focuses on finding the optimal solution for wafer scheduling through genetic algorithms, so as to make the task assignment for the machines achieve the situation shown in the upper half of FIG. 4, without encountering the situation shown in the lower half of FIG. 4. The process shown in FIG. 5 may be adopted by the CMP system 100 shown in FIG. 1 and may be briefly summarized as the following steps:

Step 502: The flow begins;
Step 504: Perform an initialization program;
Step 506: Calculate the adaptability;
Step 508: Determine whether the adaptability has reached the expected value. If yes, the flow goes to Step 520; otherwise, the flow goes to Step 510;
Step 510: Perform selection on the current dispatch samples in order to generate selected dispatch samples;
Step 512: Perform crossing operations on the selected dispatch samples in order to generate crossed dispatch samples;
Step 514: Calculate the adaptability once again;
Step 516: Determine whether the adaptability has reached the expected value. If yes, the flow hops to Step 520; otherwise, the flow goes to Step 518;
Step 518: Perform mutating operations on the selected dispatch samples and the crossed dispatch samples in order to generate mutated dispatch samples. The flow hops to Step 506;
Step 520: The flow ends.

Figure 6A:
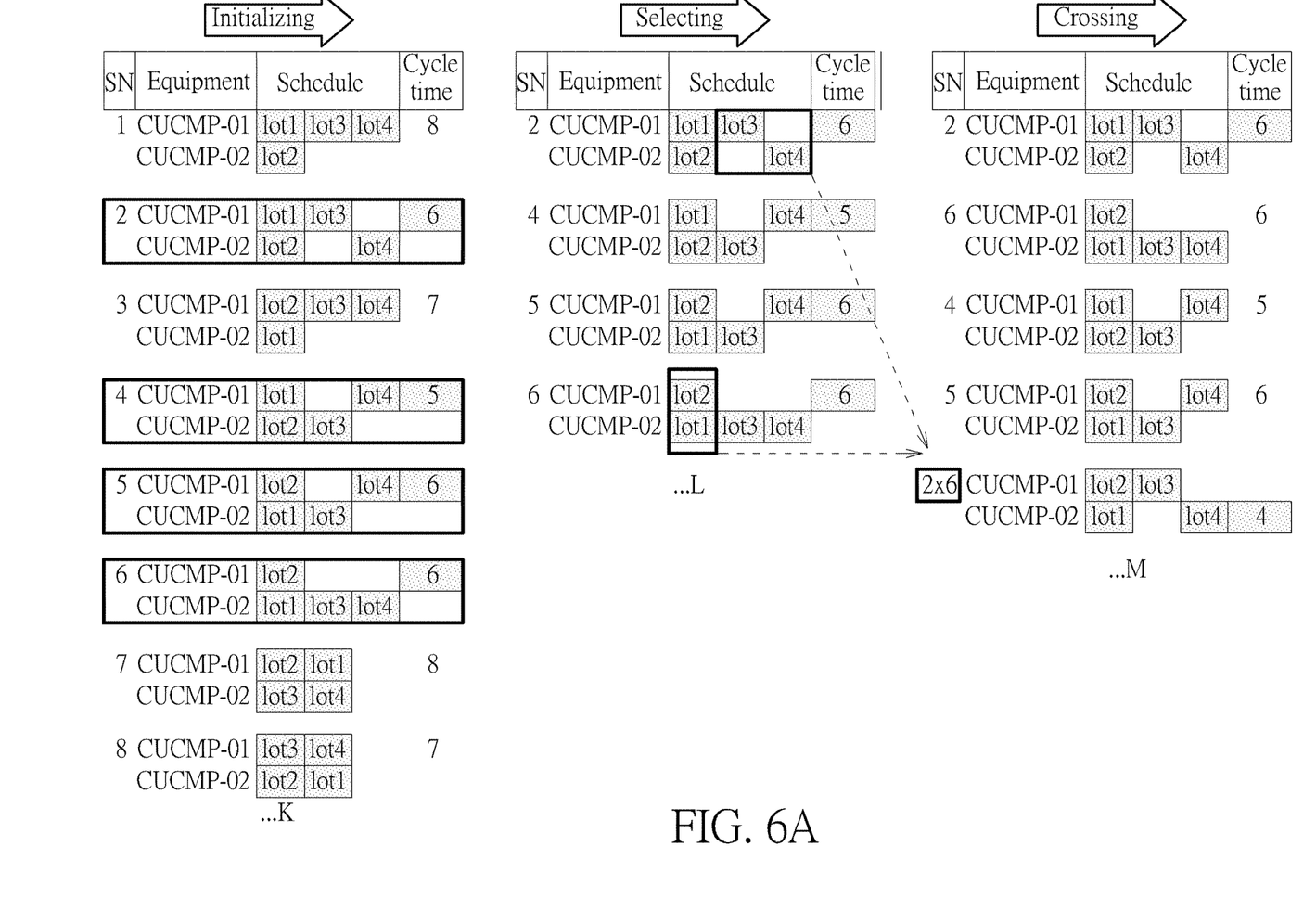
FIGS. 6A and 6B illustrate the initialization, selection, crossing, mutation steps corresponding to FIG. 5.
Figure 6B:
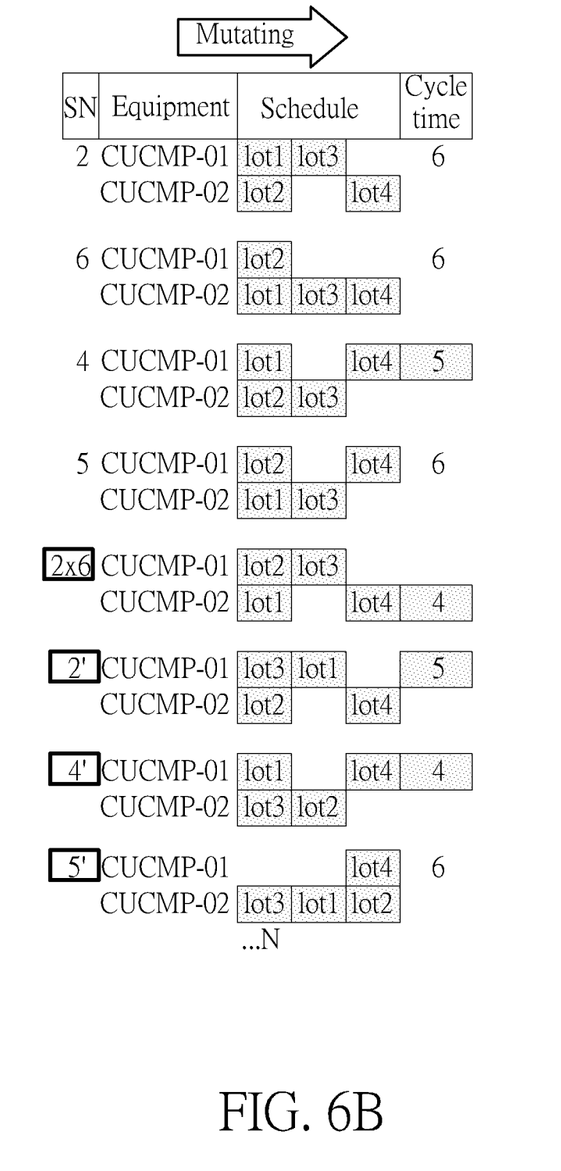

Please refer to FIGS. 6A and 6B, which are schematic diagrams corresponding to the examples of the steps of initialization, selection, crossing, and mutation corresponding to FIG. 5, wherein the adaptability is an index for determining whether the generated dispatch process is the best solution. In the examples of FIGS. 6A and 6B, the target dispatch process will have the smallest total processing time, which means and the summation of the calculation time, Pilot time, and the Head idle seasoning time is smallest. In this example, the adaptability may be the cycle time. Initially, in the initialization phase shown at the leftmost of FIG. 6A, the processor of the CMP system will first generate multiple sets of initialization work schedules according to the machine information of a plurality of CMP machines. Although this example only illustrates the first few sets of work schedules in the initialization, selection, crossing, and mutation phases in detail without showing the rest of work schedules, it is for illustration purposes only. In actual implementation, the present invention does not limit the number of initialization work schedules.

In the initialization phase, the schedules numbered 2, 4, 5, and 6 have better adaptability (that is, smaller time period or higher cycle time), and therefore these four sets of schedules will be filtered to the next stage (i.e. the selection phase). The initialization phase eliminates some unsuitable schedules. That is, In comparison to the rest of initialization work schedules within the K set of initialization work schedules, the L sets of intermediate work schedules have shorter cycle time. Please note that in this example, there are a total of K set of initialization work schedules, L sets of intermediate schedule, M sets of crossed schedule, and N sets of mutated schedule, wherein K, L, M, N may be arbitrary positive integers. The present invention does not specifically limit the range of K, L, M, N, but in this example, K>L and N>M>L.

Next, in the crossing phase, the schedules numbered 2 and 6 are selected for cross-processing to generate the Schedule 2×6, wherein the first interval of Schedule 2×6 is arranged according to Schedule 6, and the second and third intervals of Schedule 2×6 is arranged according to Schedule 2. In other words, In comparison to Schedule 2, the arrangement of lot1 and lot2 in Schedule 2×6 becomes upside-down. Similarly, the present invention may also generate a set of new crossed schedule through any other two sets of schedules. In the situation where there are a totally L sets of intermediate work schedules, it is assumed that a set of crossed work schedules may be generated by matching any two sets of work schedules. Theoretically, L! sets of crossed work schedules can be generated accordingly, or even more crossed work schedules can be generated (considering that there may be more than one way of performing crossing operations between any two sets of work schedules). In addition, the value of M can be either defined by the maximum number of crossing operations the L sets of intermediate work schedules, or defined by a predetermined number.

Next, the flow goes to the mutation phase shown in FIG. 6B from the crossing phase in FIG. 6A. The mutating operations may be performed on the L sets of intermediate work schedules and/or the aforementioned M sets of crossed work schedules. In comparison to Schedule 2, the arrangements of lot1 and lot3 in its counterpart mutated Schedule 2' are swapped with each other. In comparison to Schedule 4, the arrangements of lot2 and lot3 in its counterpart mutated Schedule 4' are swapped with each other. In comparison to schedule 5, the arrangements of lot1, lot2 and lot3 in its counterpart mutated schedule 5' are modified.

Theoretically, under the situation where L sets of intermediate work schedules and M sets of crossed work schedules are available, 2(L+M) sets of mutated work schedules can be generated, or even more mutated work schedules can be generated (considering there can be multiple ways to perform mutation between any two sets of work schedules). In other words, the ways to generate the N sets of mutated work schedules may comprise: respectively performing random disturbance on each of N sets of work schedules within the L sets of intermediate work schedules and the M sets of crossed work schedules, in order to generate the N sets of mutated work schedules.

Lastly, the optimizing calculation can be performed on the L sets of intermediate work schedules, the M sets of crossed work schedules and the N sets of mutated work schedules, in order to generate a target work schedule. Therefore, auto-dispatching corresponding to the CMP machines can be performed according to the target work schedule, in order to minimize the time/power consumption of the work schedules. Specifically, the aforementioned optimizing calculation is based on the summation of the processing time of the CMP machines, Pilot processing time and the Head idle seasoning time, to select one set of work schedules from the L sets of intermediate work schedules, the M sets of crossed work schedules and the N sets of mutated work schedules that has the shortest elapsed time as the target work schedule.

The target work schedule may be further used to adjust the number of enabled CMP machines, and may adjust the numbers of wafers carried by load ports of the CMP machines. In addition, a characteristic of the present invention is to use the real time dispatching system (such as the real time dispatching system 112 shown in FIG. 1) to automatically dispatch for the CMP machines according to the target work schedule, and the target work schedule will be transmitted to the real time dispatching system to perform the CMP dispatching.

Figure 7:
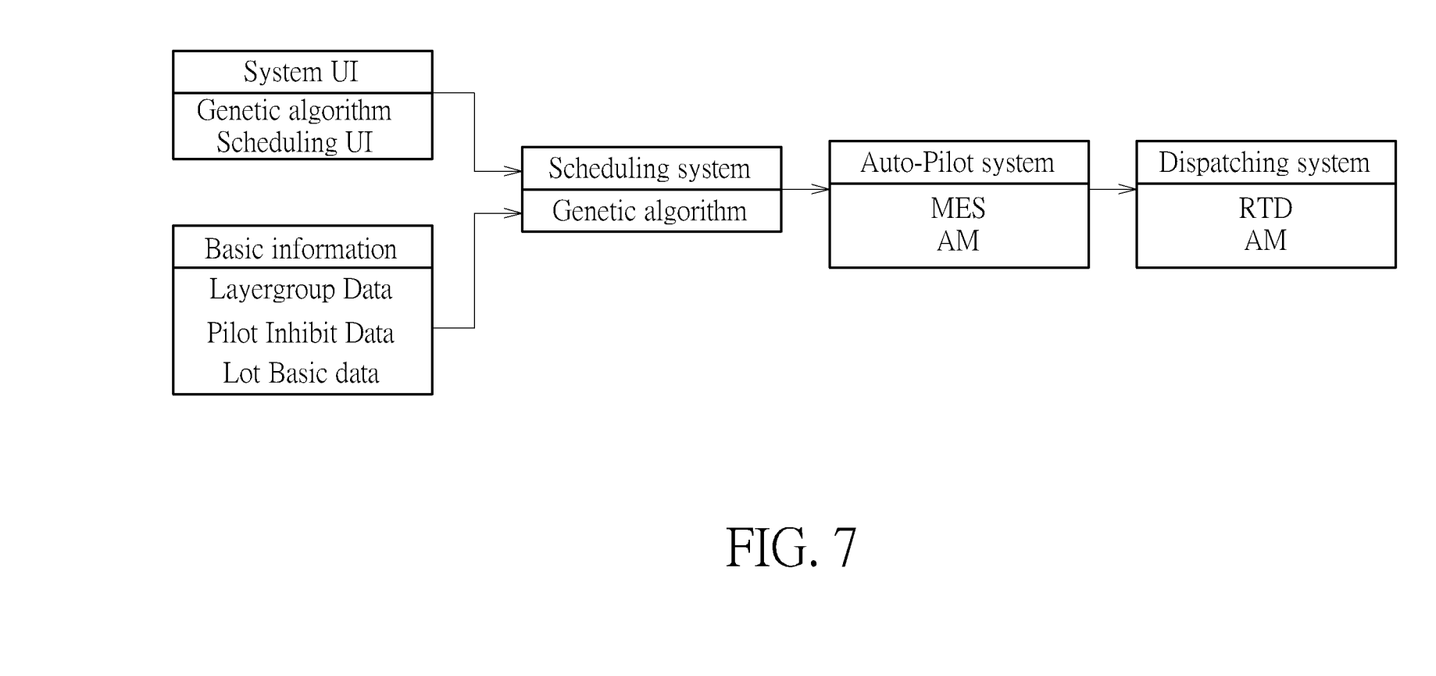
FIG. 7 is a block diagram illustrating a systematic structure according to an embodiment of the present invention.
Figure 8:
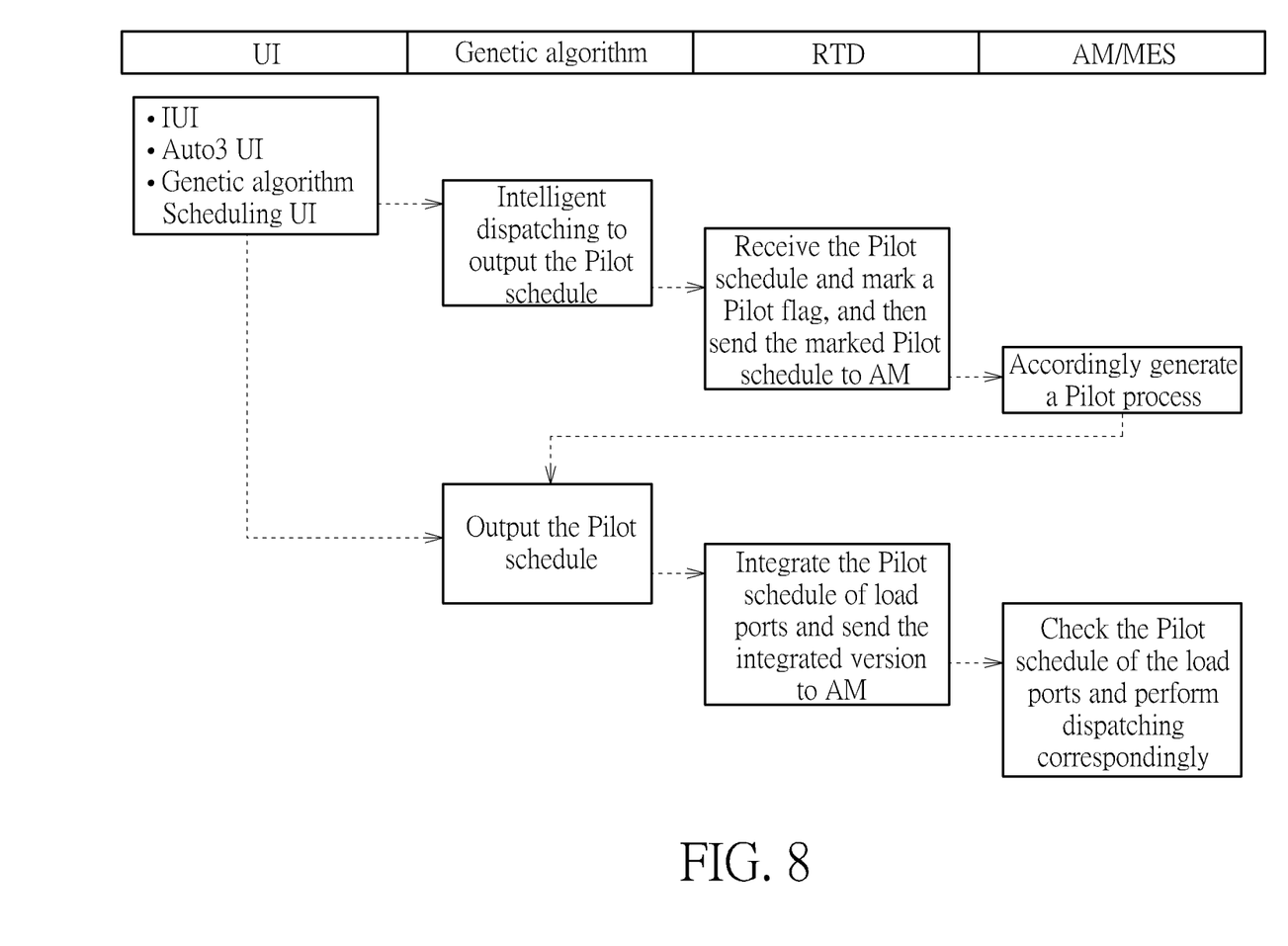
FIG. 8 illustrates the implementation details of the systematic structure in FIG. 7.
Figure 9:
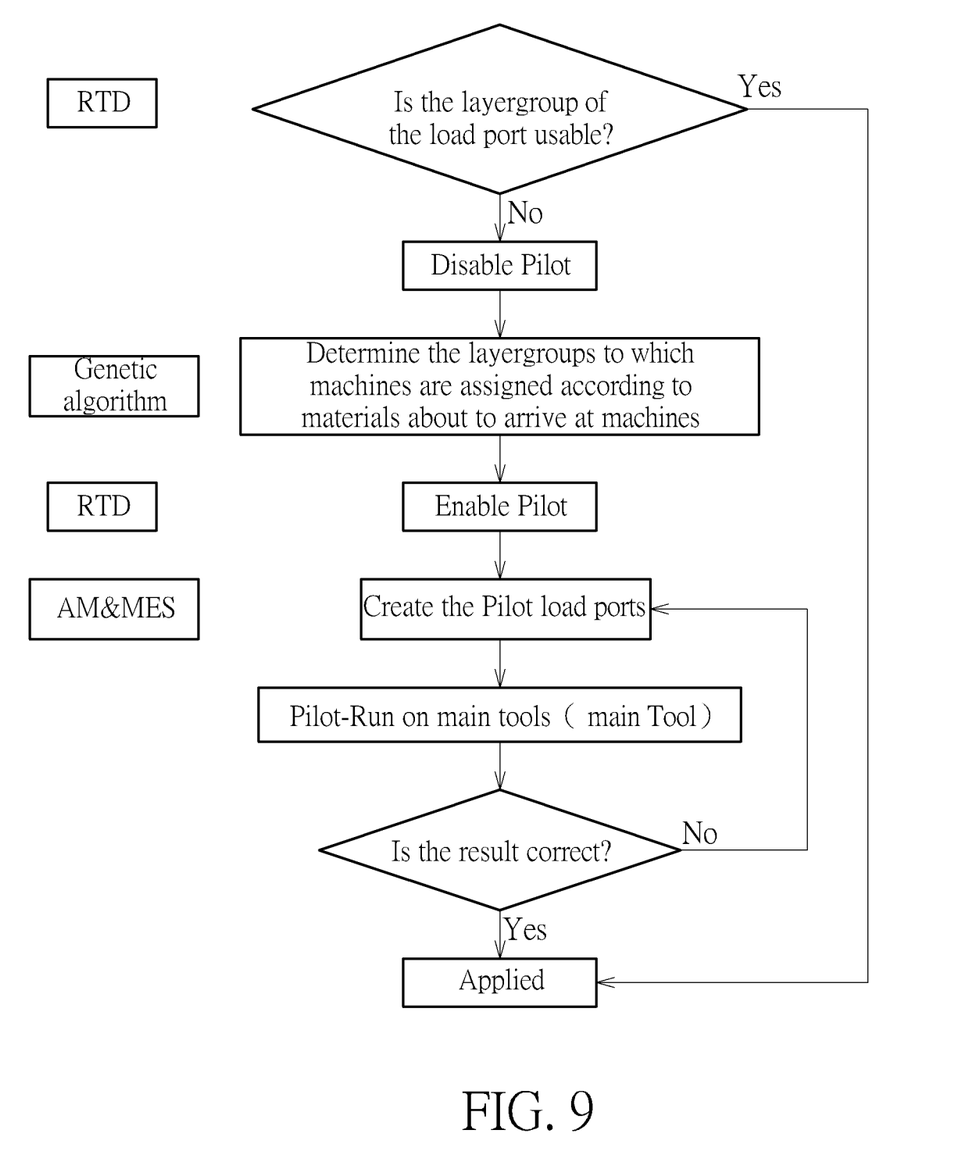
FIG. 9 is a flowchart illustrating an auto-dispatching system according to an embodiment of the present invention.

Please refer to FIG. 7-FIG. 9. FIG. 7 is a block diagram illustrating a systematic structure according to an embodiment of the present invention, FIG. 8 illustrates the implementation details of the systematic structure in FIG. 7, and FIG. 9 is a flowchart illustrating an auto-dispatching system according to an embodiment of the present invention, and can be jointly referenced with FIG. 7 and FIG. 8. As shown in FIG. 7, Block "Scheduling system" will extract information required by the genetic algorithm from Block "System UI" and Block "Basic information", and then the generated dispatch process will be sent to the following Blocks "Dispatching system" and "Auto-Pilot system", wherein RTD stands for Real Time Dispatch, MES stands for Manufacturing Execution System, IUI stands for Intelligent User Interface, Auto3 UI stands for an Auto User Interface, and AM stands for activity manager. The detailed operations can be seen from FIG. 8 and FIG. 9, and will be omitted here for brevity.

Figure 10:
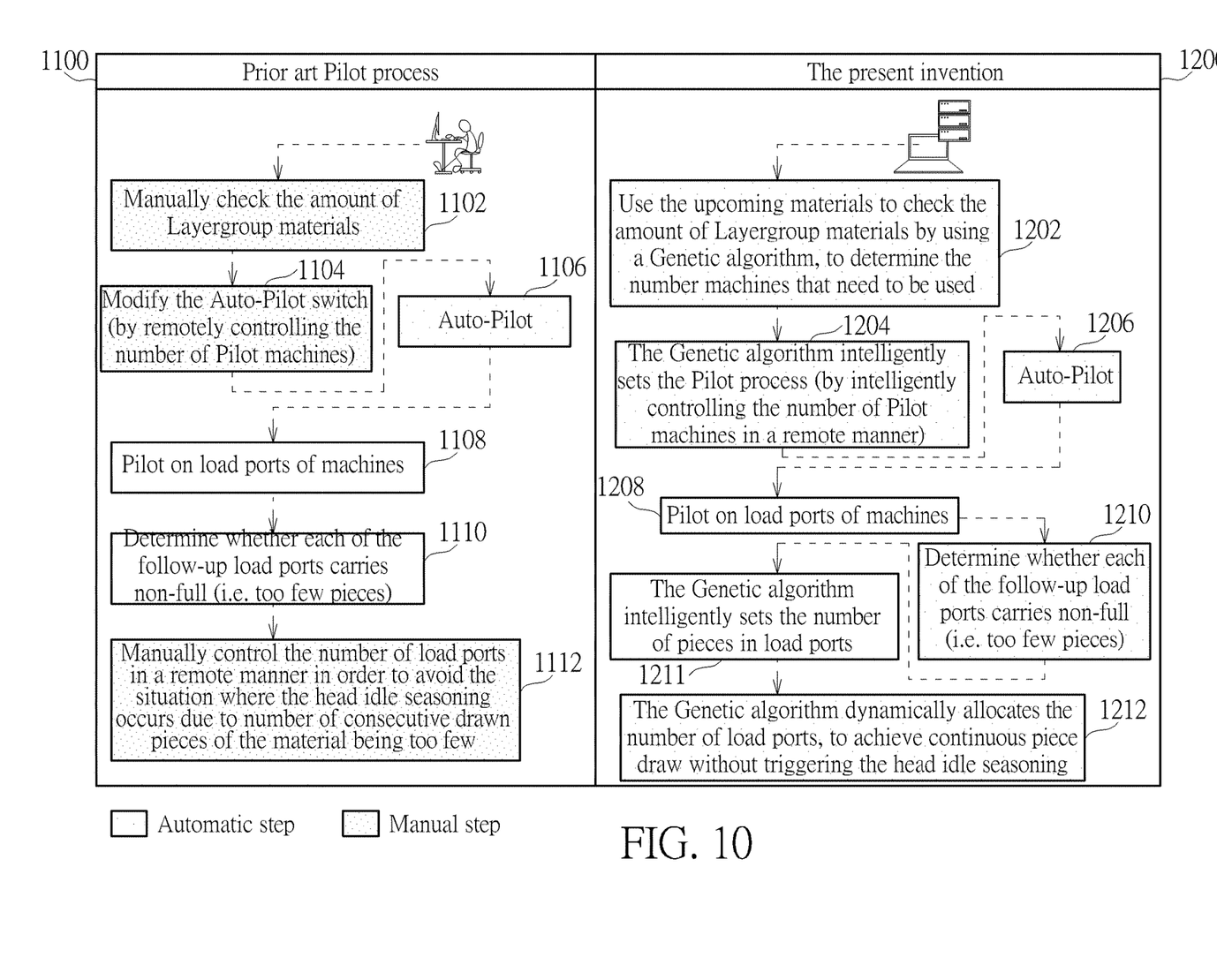
FIG. 10 illustrates the difference between the present invention and a related art solution.

FIG. 10 illustrates the differences between the present invention and a prior art solution. As can be seen from FIG. 10, the present invention indeed has provided great technical improvement. For example, in the conventional Pilot process 1100, the amount of Layer group material is checked manually (Step 1102) for determine how many machines are going to be used. Then, the Auto-Pilot switch is modified manually in Step 1104, e.g. by remotely controlling the number of Pilot machines. After the auto-Pilot is done and the process goes back to the main the host machine (Steps 1106, 1108), the flow goes to Step 1100, determining whether each of the follow-up load ports carries are not full (i.e. carrying too few pieces). Lastly, the flow goes to Step 1112 to manually control the number of load ports in a remote manner in order to avoid the situation where the head idle seasoning occurs when the number of consecutive drawn pieces of the material is too few, which leads to the Head idle seasoning. Note that the auto-Pilot switch is arranged on the IUI system, and the production line worker may control On/Off of the auto-dispatching system through changing the setting value thereof. In comparison, the present invention may save a decent amount of human effort, and reduce the possibility of incorrect judgment due to human factors. In other words, in comparison to the conventional dispatch process 1100, the dispatch process 1200 of the present invention is capable of preventing the human efforts and errors required in Steps 1102, 1104, 1112, which not only save a lot of time, but also generate more precise work schedules automatically.

Figure 11:
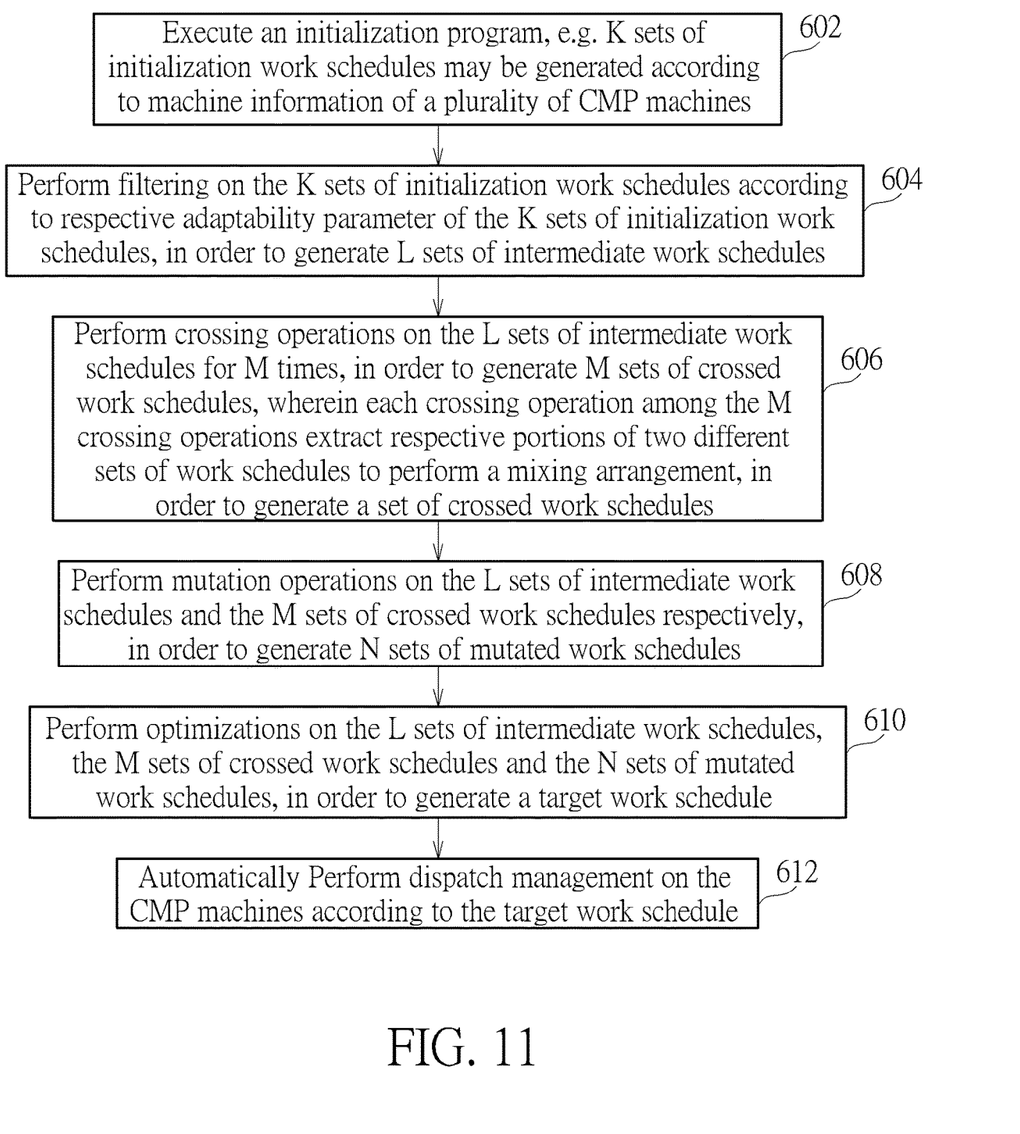
FIG. 11 is a flowchart illustrating a dispatch management method that Pilot-run on a computer according to an embodiment of the present invention.

Please refer to FIG. 11, which is a flowchart illustrating a dispatch management method 600 for Pilot-run on a computer according to an embodiment of the present invention. The method is applicable to CMP units, such as the CMP unit 100 shown in FIG. 1. Please note that as long as a substantially same result can be obtained, the steps below are not necessarily required to follow the order shown in FIG. 11. The method shown in FIG. 11 may be adopted by the CMP system 100 shown in FIG. 1, and are summarized as following steps:

Step 602: Execute an initialization program, e.g. K set of initialization work schedules may be generated according to machine information of a plurality of CMP machines.

Step 604: Perform filtering on the K set of initialization work schedules according to respective adaptability parameter of the K set of initialization work schedules, in order to generate L sets of intermediate work schedules;

Step 606: Perform crossing operations on the L sets of intermediate work schedules for M times, in order to generate M sets of crossed work schedules, wherein each crossing operation among the M crossing operations extract respective portions of two different sets of work schedules to perform a mixing arrangement, in order to generate a set of crossed work schedules;

Step 608: Perform mutation operations on the L sets of intermediate work schedules and the M sets of crossed work schedules respectively, in order to generate N sets of mutated work schedules;

Step 610: Perform optimizations on the L sets of intermediate work schedules, the M sets of crossed work schedules and the N sets of mutated work schedules, in order to generate a target work schedule; and Step 612: Automatically Perform dispatch management on the CMP machines according to the target work schedule.

In view of the above, the present invention embodiment is capable of properly and effectively improving the smoothness of running polishing units, and more particularly, is capable of preventing the situation where the consecutive drawn wafer pieces is significantly less than the capacity of a machine, and thereby solves the Head idle seasoning issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dispatch management method for running a trial production process on a computer and applicable to chemical mechanical polishing (CMP) machines, comprising:
   generating K sets of initialization work schedules based on machine information of the CMP machines;
   filtering the K sets of initialization work schedules according to respective adaptability parameters of the K set of initialization work schedules to obtain L sets of intermediate work schedules among the K sets of initialization work schedule;

performing crossing operations on the L sets of intermediate work schedules for M times to generate M sets of crossed work schedules, wherein each of M crossing operations blend contents of a different duo of work schedules by respectively extracting portions of each of the duo in order to generate a set of crossed work schedules;

performing mutation calculations on contents of the L sets of intermediate work schedules and the M sets of crossed work schedules to generate N sets of mutated work schedules;

performing optimization calculations on the L sets of intermediate work schedules, the M sets of crossed work schedules and the N sets of mutated work schedules to generate a target work schedule; and automatically performing dispatch on the CMP machines according to the target work schedule;

wherein the step of performing optimization calculations on the L sets of intermediate work schedules, the M sets of crossed work schedules and the N sets of mutated work schedules to generate a target work schedule comprises:

according to a summation of processing time, trial production process processing time and head idle seasoning time of the CMP machines, selecting a work schedule from the L sets of intermediate work schedules, the M sets of crossed work schedules and the N sets of mutated work schedules as the target work schedule.

2. The dispatch management method of claim 1, wherein the machine information of the CMP machines comprises:
groups to which products belong, machine idle time, and machine operation time.

3. The dispatch management method of claim 1, wherein respective adaptability parameters of the K set of initialization work schedules comprise cycle time.

4. The dispatch management method of claim 3, wherein the L sets of intermediate work schedules comprise shorter cycle time than remaining initialization work schedules in the K sets of initialization work schedules other than the L sets of intermediate work schedules.

5. The dispatch management method of claim 1, wherein the step of performing crossing operations on the L sets of intermediate work schedules for M times to generate the M sets of crossed work schedules comprises:
setting the value of M by a maximum number of times the L sets of intermediate work schedules is capable of performing crossing operations, or by a predetermined number.

6. The dispatch management method of claim 1, wherein the step of performing mutation calculations on contents of the L sets of intermediate work schedules and the M sets of crossed work schedules to generate the N sets of mutated work schedules comprises:
randomly disturbing on each work schedule among N sets of work schedules of the L sets of intermediate work schedules and the M sets of crossed work schedules, to generate the N sets of mutated work schedules.

7. The dispatch management method of claim 1, further comprising:
according to the target work schedule, determining an amount of the CMP machines to be used.

8. The dispatch management method of claim 1, further comprising:
determining a loaded wafer amount of load ports of the CMP machines according to the target work schedule.

9. The dispatch management method of claim 1, wherein the step of automatically performing dispatch on the CMP machines according to the target work schedule comprises:
sending the target work schedule to a Real time dispatch (RTD) system to perform CMP dispatching.

10. A chemical mechanical polishing (CMP) system, arranged to perform CMP dispatching management by running a trial production process on a computer, the CMP system comprising:
a plurality of CMP machines;
a processor, arranged to execute the following steps:
generating K set of initialization work schedules according to machine information of a plurality of CMP machines;
filtering the K sets of initialization work schedules according to respective adaptability parameters of the K set of initialization work schedules to obtain L sets of intermediate work schedules among the K sets of initialization work schedules;
performing crossing operations on the L sets of intermediate work schedules for M times to generate M sets of crossed work schedules, wherein each of the M times of crossing operations is to blend contents of a different duo of work schedules by respectively extracting portions of each of the duo in order to generate a set of crossed work schedules;
performing mutation calculations on contents of the L sets of intermediate work schedules and the M sets of crossed work schedules to generate N sets of mutated work schedules;
performing optimization calculations on the L sets of intermediate work schedules, the M sets of crossed work schedules and the N sets of mutated work schedules to generate a target work schedule; and
automatically performing dispatch on the CMP machines according to the target work schedule;
wherein the step of performing optimization calculations on the L sets of intermediate work schedules, the M sets of crossed work schedules and the N sets of mutated work schedules to generate a target work schedule comprises:
according to a summation of processing time, trial production process processing time and head idle seasoning time of the CMP machines, selecting a work schedule from the L sets of intermediate work schedules, the M sets of crossed work schedules and the N sets of mutated work schedules as the target work schedule.

11. The CMP system of claim 10, wherein the machine information of the CMP machines comprises:
groups to which products belong, machine idle time, and machine operation time.

12. The CMP system of claim 10, wherein respective adaptability parameters of the K set of initialization work schedules comprise cycle time.

13. The CMP system of claim 12, wherein the L sets of intermediate work schedules comprise shorter cycle time than remaining initialization work schedules in the K sets of initialization work schedules other than the L sets of intermediate work schedules.

14. The CMP system of claim 10, wherein the step of performing crossing operations on the L sets of intermediate work schedules for M times to generate the M sets of crossed work schedules comprises:

setting the value of M by a maximum number of times the L sets of intermediate work schedules is capable of performing crossing operations, or by a predetermined number.

15. The CMP system of claim 10, wherein the step of performing mutation calculations on contents of the L sets of intermediate work schedules and the M sets of crossed work schedules to generate the N sets of mutated work schedules comprises:

randomly disturbing on each work schedule among N sets of work schedules of the L sets of intermediate work schedules and the M sets of crossed work schedules, to generate the N sets of mutated work schedules.

16. The CMP system of claim 10, wherein the processor is further arranged to execute the following step:

according to the target work schedule, determining an amount of the CMP machines to be used.

17. The CMP system of claim 10, wherein the processor is further arranged to execute the following step:

determining a loaded wafer amount of load ports of the CMP machines according to the target work schedule.

18. The CMP system of claim 10, wherein the step of automatically performing dispatch on the CMP machines according to the target work schedule comprises:

sending the target work schedule to a Real time dispatch (RTD) system to perform CMP dispatching.

* * * * *